(12) United States Patent
Mullins

(10) Patent No.: US 10,343,770 B2
(45) Date of Patent: Jul. 9, 2019

(54) TORQUE AND PITCH MANAGED QUAD-ROTOR AIRCRAFT

(71) Applicant: Joe H. Mullins, Albuqueque, NM (US)

(72) Inventor: Joe H. Mullins, Albuqueque, NM (US)

( * ) Notice: Subject to any disclaimer, the term of this patent is extended or adjusted under 35 U.S.C. 154(b) by 508 days.

(21) Appl. No.: 15/058,119

(22) Filed: Mar. 1, 2016

(65) Prior Publication Data
US 2017/0253326 A1 Sep. 7, 2017

(51) Int. Cl.
*B64C 27/08* (2006.01)
*B64C 27/14* (2006.01)

(52) U.S. Cl.
CPC .............. *B64C 27/08* (2013.01); *B64C 27/14* (2013.01)

(58) Field of Classification Search
CPC ......... B64C 27/57; B64C 27/12; B64C 27/14; B64C 27/54; B64C 27/58; B64C 27/08; B64D 31/12; B64D 31/06; B64D 35/04; B64D 35/06
USPC ...................................... 416/31, 43, 47, 147
See application file for complete search history.

(56) References Cited

U.S. PATENT DOCUMENTS

| | | | | |
|---|---|---|---|---|
| 1,749,471 | A * | 3/1930 | De Bothezat | B64C 27/08 244/17.23 |
| 2,057,877 | A | 10/1936 | Bragunier | |
| 2,296,006 | A * | 9/1942 | Wagner | B64D 35/04 244/53 R |
| 2,540,404 | A | 4/1949 | Neal | |
| 2,959,228 | A * | 11/1960 | Larkin | B64C 11/325 416/30 |
| 2,987,272 | A | 6/1961 | Vogt | |
| 3,053,480 | A * | 9/1962 | Vanderlip | B64C 27/54 244/17.13 |
| 3,054,457 | A | 9/1962 | McNeill | |
| 3,115,936 | A * | 12/1963 | Blews, Jr. | B64D 35/04 416/120 |

(Continued)

FOREIGN PATENT DOCUMENTS

RO         112833 B1 * 1/1998

OTHER PUBLICATIONS

Wikipedia, Helicopter Flight Controls, https://en.wikipedia.org/wiki/Helicopter_flight_controls; archived by Internet Archive on Oct. 18, 2014, https://web.archive.org/web/20141018202953/https://en.wikipedia.org/wiki/Helicopter_flight_controls; accessed Mar. 31, 2018 (Year: 2014).*

(Continued)

*Primary Examiner* — Brian M O'Hara
*Assistant Examiner* — Alexander V. Giczy
(74) *Attorney, Agent, or Firm* — Seth M. Reiss, AAL, ALLLC

(57) ABSTRACT

A torque and pitch managed four rotor aircraft includes intersecting blades connected by synchronizing gears. The power for the rotors is provided by individual motors, one for each rotor, the motors preferably electric. Each rotor-motor assembly includes a torque management system including a set of torque sensors mounted on the drive shaft of the rotor-motor, the torque management system configured to balance the load torque presented by the rotors against the torque supplied by the motors. An additional overriding feedback system regulates rotational speed of the rotors. Direction of the aircraft is effected by adjusting the pitch of the individual rotors, and power is supplied through a battery and/or a motor-generator system located in the aircraft.

15 Claims, 5 Drawing Sheets

(56) References Cited

U.S. PATENT DOCUMENTS

| | | | | |
|---|---|---|---|---|
| 3,184,181 | A | 5/1965 | Kaplan | |
| 3,185,410 | A | 5/1965 | Smart | |
| 3,636,364 | A * | 1/1972 | Stempler | B64C 11/50 |
| | | | | 250/208.2 |
| 3,762,669 | A | 10/1973 | Curci | |
| 3,824,848 | A * | 7/1974 | Parkinson | G01L 3/109 |
| | | | | 73/862.328 |
| 4,083,518 | A * | 4/1978 | Garrison | G01L 3/101 |
| | | | | 244/17.11 |
| 4,628,455 | A * | 12/1986 | Skutecki | G05D 1/0669 |
| | | | | 244/17.13 |
| 4,807,129 | A * | 2/1989 | Perks | B64C 13/503 |
| | | | | 244/17.13 |
| 4,874,291 | A | 10/1989 | Roberts | |
| 4,899,957 | A | 2/1990 | Eickmann | |
| 5,188,511 | A * | 2/1993 | Ebert | B64C 27/82 |
| | | | | 244/17.19 |
| 5,352,090 | A * | 10/1994 | Churchill | B64C 27/008 |
| | | | | 416/34 |
| 5,951,608 | A * | 9/1999 | Osder | B64C 27/18 |
| | | | | 244/11 |
| 6,260,796 | B1 * | 7/2001 | Klingensmith | B64C 27/08 |
| | | | | 244/17.11 |
| 6,879,885 | B2 * | 4/2005 | Driscoll | B64C 27/12 |
| | | | | 416/27 |
| 7,699,260 | B2 * | 4/2010 | Hughey | B64C 31/028 |
| | | | | 244/17.11 |
| 7,925,392 | B2 * | 4/2011 | Altieri | B64C 29/005 |
| | | | | 701/3 |
| 8,123,176 | B2 * | 2/2012 | Mak | G05D 1/0858 |
| | | | | 244/17.11 |
| 8,469,306 | B2 * | 6/2013 | Kuhn, Jr. | B64C 29/0033 |
| | | | | 244/12.4 |
| 8,727,271 | B2 | 5/2014 | Salyer | |
| 9,205,758 | B2 * | 12/2015 | Cox | B60L 3/108 |
| 9,701,406 | B2 * | 7/2017 | Robertson | B64C 29/0033 |
| 2002/0104922 | A1 | 8/2002 | Nakamura | |
| 2006/0054737 | A1 * | 3/2006 | Richardson | B64C 27/57 |
| | | | | 244/17.11 |
| 2009/0224096 | A1 * | 9/2009 | Waide | B64C 29/0033 |
| | | | | 244/60 |
| 2010/0030495 | A1 * | 2/2010 | Jackson | G01L 25/003 |
| | | | | 702/41 |
| 2010/0276549 | A1 * | 11/2010 | Karem | B64C 27/08 |
| | | | | 244/7 A |
| 2012/0153074 | A1 * | 6/2012 | Nannoni | B64C 27/57 |
| | | | | 244/17.13 |
| 2014/0374532 | A1 * | 12/2014 | Duffy | B64C 37/02 |
| | | | | 244/2 |
| 2015/0367951 | A1 * | 12/2015 | Massot | F02C 6/206 |
| | | | | 701/3 |
| 2016/0378108 | A1 * | 12/2016 | Paczan | B64C 37/02 |
| | | | | 705/330 |
| 2017/0101176 | A1 * | 4/2017 | Alber | B64C 29/0033 |
| 2017/0121029 | A1 * | 5/2017 | Blyth | B64D 31/12 |
| 2017/0174335 | A1 * | 6/2017 | Malloy | B64C 27/08 |
| 2017/0225794 | A1 * | 8/2017 | Waltner | B64D 31/06 |
| 2017/0247107 | A1 * | 8/2017 | Hauer | B64C 39/024 |
| 2017/0297695 | A1 * | 10/2017 | Schaeffer | B64C 27/57 |
| 2017/0327219 | A1 * | 11/2017 | Alber | B64C 29/02 |

OTHER PUBLICATIONS

FAA, Helicopter Flying Handbook (FAA-H-8083-21A) (2012)—Chapter 3 Helicopter Flight Controls; https://www.faa.gov/regulations_policies/handbooks_manuals/aviation/helicopter_flying_handbook/; accessed Mar. 31, 2018 (Year: 2012).* thinkRC.com, "Fixed pitch vs Collective pitch RC Helicopters", http://www.thinkrc.com/faq/fixed-vs-collective-pitch.php; archived by Internet Archive on Mar. 17, 2015, https://web.archive.org/web/20150317141419/http://www.thinkrc.com/faq/fixed-vs-collective-pitch.php; accessed Mar. 31, 2018 (Year: 2015).*

Abhishek Jain, "Quadcopter: A Review" in DIY Drones, Mar. 2, 2014; https://diydrones.com/profiles/blogs/quadcopter-a-review, accessed May 29, 2018 (Year: 2014).*

Xang, Xinhua, and Lilong Cai. "Mathematical modeling and control of a tilt-rotor aircraft." Aerospace Science and Technology 47 (2015): 473-492.; accessible from https://arxiv.org/ftp/arxiv/papers/1505/1505.06784.pdf; accessed Dec. 20, 2018 (Year: 2015).*

* cited by examiner

TORQUE AND PITCH MANAGED QUAD-ROTOR AIRCRAFT

CROSS-REFERENCE RELATED TO RELATED APPLICATION

This application does not claim the benefit of an earlier filed patent application.

FIELD OF THE INVENTION

The present invention relates to non-fixed wing aircraft, commonly known as rotorcraft or helicopters. More specifically, described herein are novel configurations and embodiments for rotorcraft rendering them easier and safer to fly, more durable and more efficient.

BACKGROUND OF THE INVENTION

Helicopters have been successful and are very widely used, but the most common configuration suffers from a number of challenges which, although managed successfully in conventional helicopters, nevertheless make them difficult to fly, inefficient, riskier than other types of aircraft, and cause them to require frequent and careful maintenance.

The conventional helicopter configuration comprises a single lift rotor and a tail rotor. The latter is required because the main rotor applies a torque to the aircraft which must be canceled, and the tail rotor is used to cancel the main rotor torque. The importance of this is evident when one sees what happens to the craft if the tail rotor is destroyed or damaged. The helicopter goes into what is usually a fatal spin.

Another complication of conventional rotorcraft arises because of what is necessary to produce forward flight, as distinct from stationary hovering. Assume the direction of rotation of the main rotor is clockwise from the top. When traveling forward at any significant speed, the rotor blades, when they are on the left side of the vehicle, travel toward the incoming air stream, creating increased lift. For balance, the pitch of the blade must be decreased when rotating on the left side in order to maintain constant lift. On the other side, the blades travel away from the incoming air stream, reducing lift. Therefore the pitch of the same blade must be increased when the blade travels on the right side (for a clockwise rotation) to keep lift constant.

To correct for these unwanted positive and negative lift forces, a mechanism that decreases the blade pitch when it is on the left side of the aircraft and increases it when the blade is on the rights side of the aircraft is employed. This mechanism constantly operates, changing the pitch every rotation of the blade. In addition, in order for the helicopter to fly in a forward direction, the same mechanism must increase the pitch of the blade when it is in the rear part of its rotation and/or decrease the pitch when it is in the forward portion to tilt the aircraft so that the main blade furnishes a forward thrust. For rearward flight, the opposite must occur. All of this involves a "swashplate", as it is called, to perform the pitch adjustments every cycle of the rotor. As would be expected, this mechanism is fated for a great deal of wear and tear besides creating an environment for severe vibration.

According to other rotorcraft configurations, such as a two rotor aircraft, for example the Chinook, the torque problem is eliminated but the other challenges remain, such as the need for a swashplate and its concomitant drawbacks.

An object of the current invention is to provide a rotorcraft in which rotation of the rotors do not result in unwanted positive and negative lift and which has no need of a swashplate or similar mechanism to perform a plurality of pitch adjustments during each cycle of the rotor.

There are a number of rotorcraft "drone" configurations that have four blades, one on each corner of the aircraft fuselage. This configuration cancels the torque produced by a single rotor by arranging the rotors such that adjacent blades rotate in opposing directions, resulting in two blades rotating in one direction while the other two rotate in the other direction. However, these drones are relatively small, lightweight objects, and the blades are fairly short and non-intersecting. The result is that the devices use considerably more energy to stay aloft for a given weight than they would if the rotor blades were much longer, rotating at lower speeds, rendering them impracticable for vehicles that carry passengers and cargo.

Other four-rotor aircraft have been built or proposed, sometimes termed "quadrotor" aircraft, wherein the rotors are longer and intersect or overlap, as illustrated in FIG. 1, but require synchronization of all rotors to prevent the rotors from colliding.

A further object of the current invention is to provide for a quad-rotor aircraft having four intersecting rotors with adjacent rotors rotating in opposed directions that employs novel synchronization mechanisms to prevent rotor collision while promoting safety and efficiency of operation and flight.

Another object of current invention is to provide for a quad-rotor aircraft with intersecting rotors wherein the rotation of the rotors are synchronized by more than one method simultaneously.

Another object of current invention is to provide for a quad-rotor aircraft with intersecting rotors that is more efficient, safer, and easier to maintain than currently available quad-rotor aircraft.

Other objects and advantages of the current invention will be obvious to those skilled in the relevant art from the ensuing description and the drawings referenced therein.

SUMMARY OF THE INVENTION

These and other objects are achieved in the instant invention, a torque and pitch managed quad-rotor aircraft. The subject aircraft comprises an aircraft fuselage powered by intersecting rotors, for example of the two bladed variety. The intersection of blades is controlled by synchronizing gearing, which in one embodiment could be a set of four beveled gears. The motive power to the rotors is provided by motors, one motor dedicated to each rotor, and controlled by torque sensors and a rotational speed governor.

In the case of each of the four rotors, one torque sensor measures the torque load produced by the rotor, while another torque sensor measures the torque produced by the driving motor. A local feedback system controls the motors to reduce the difference between these two torques to zero. This reduces the load or stress on the synchronizing gears to near zero, allowing them to operate with minimum wear. Meanwhile, the synchronizing gears still operate to provide power to the blades in case of an emergency, such as the failure of one or more of the motors.

A second, overriding feedback system causes the rotational speed of the rotors to be set to a prescribed value in the manner of a governor. This controls the speed and lift of the aircraft.

Directional control of the craft is entirely governed by the fixed but variable pitch of the individual rotors. That is, the rotors are made tiltable, meaning the angle of attack of the rotors are adjustable, each individually or all together.

There are no swashplates.

According to one embodiment, the intersecting blades are prevented from colliding by hard gearing, wherein the drive shafts of all four rotors are synchronized by gears, rotating at the same speed, with blades offset so that they do not interfere. There are other advantages to this synchronization, as described below.

Power is supplied to the motors via a battery or battery set, or generator, or a generator is used to recharge the batteries while the batteries supply power to the motors.

One virtue of using four motors is that of safety. The aircraft can be designed to operate, although with lower performance, if one or more of the motors fail. Overrunning hubs can be employed in case of failure of any one of the motors, in order to avoid having the rotor connected to said failed motor produce a drag on the system.

However, a more direct advantage is that the torque for each motor is separately controlled electronically in order to minimize the stress on the main synchronizing gear assembly. Ideally, except in cases of motor failure or some other unusual event, the synchronizing gear assembly operates in a near zero stress environment, greatly reducing the wear on this important component.

A number of automatic controls operated from an onboard computer provide for improved safety and reliability of the aircraft. By way of example and not limitation, an automatic system can be provided which, immediately after leaving the ground, adjusts the zero setting of the controls such that any imbalance caused by distribution of weights on the craft would be cancelled out.

In an emergency, the synchronizing gears can carry the entire load of powering the four rotors for a short time, enough to allow the vehicle to land safely.

One aspect of the quad-rotor aircraft of the subject invention is having two torque sensors on each driving rotor shaft, one sensing the load from the rotor, and one sensing the driving torque from the motor, for which there are four, one for each rotor.

Another aspect of the quad-rotor aircraft of the subject invention is a feedback system that functions to equalize the two torques, thus supplying all necessary power for the said rotor.

A further aspect of the quad-rotor aircraft of the subject invention is an overall feedback system, using the rotational speed of the rotors to apply additional power from the motors to the rotors to reach and maintain a fixed rotational speed.

An additional aspect of the quad-rotor aircraft of the subject invention are fixed pitch rotors meaning that the pitch of each rotor remains unchanged during a single rotation.

A further additional aspect of the quad-rotor aircraft of the subject invention are rotors having a fixed pitch that is adjustable independent from other rotors for purposes of maneuvering the aircraft.

DETAILED DESCRIPTION OF PREFERRED EMBODIMENTS

Figure 1:
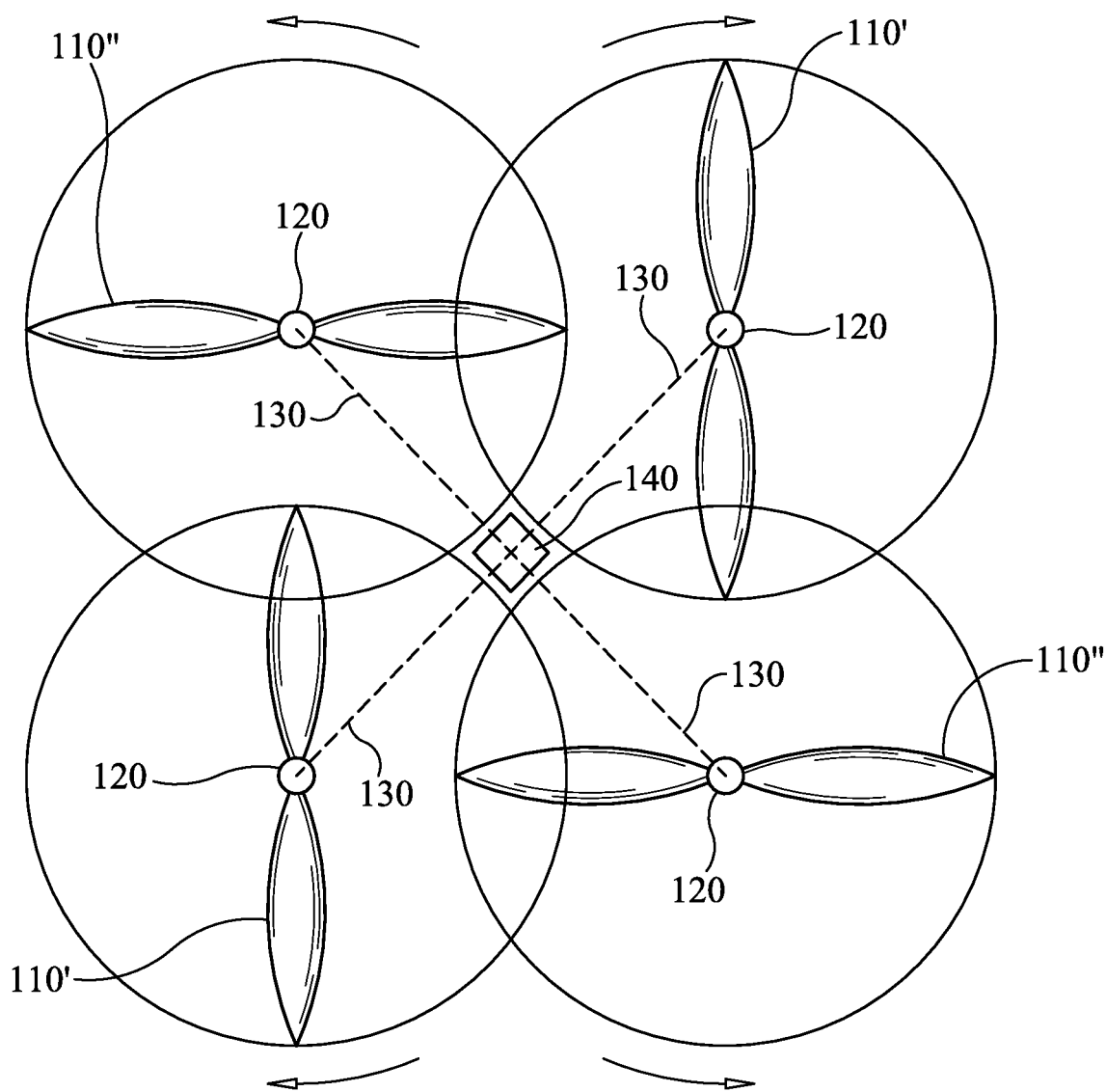
FIG. 1 is a schematic view of the four rotor configuration of the subject rotor-craft showing intersecting, two-blade rotors.

Illustrated in schematic view in FIG. 1 is a four rotor configuration of the subject rotor-craft showing, in the case of this embodiment, intersecting, two-blade rotors. Four sets of two-rotor blades 110 are shown from the top, with two blades 110' rotating clockwise and the other blades 110" rotating in opposite directions, counterclockwise. Blades 110 rotate around the end of rotor shafts 120. Rotor shafts 120 are powered through drive shafts 130. Drive shafts 130 interconnect at a main synchronous gear 140. The rotation of blades 110 are synchronized and prevented from interfering with one another by synchronous gear 140.

In common with other quad-rotor non-fixed wing aircraft designs, the four rotor configuration cancels the torque resulting from a single rotating rotor by arranging that two of blades 110 rotate in one direction and two of blades 110 rotate in the other.

The intersecting blade configuration requires that blades 110 be synchronized. In the subject invention, synchronization of blades 110 is accomplished through hard gearing 140, but helped through management of torque as described above and below.

Although the configuration of rotor 110 shown in FIG. 1 is a two blade rotor, rotor 110 can have any plurality of blades and can demonstrate, for example, three or four blades.

Details of the configuration of the rotor drive mechanism, with torque sensors, motor and hard gearing, is described below with reference to FIG. 2.

Drive shafts 130 extend outward from main synchronous gear 140. Four motors 150 power the rotation of each drive shaft 130. Mounted to each drive shaft 140 are two differential torque sensors, a load torque sensor 160 and a drive torque sensor 162. Drive torque sensor 162 is integrated with a drive wheel 170 that powers the rotation of drive shaft 130.

Load torque sensor 160 is positioned along drive shaft 130 between where drive rotor 110 (shown in FIG. 1) and where drive wheel 170 attaches to drive shaft 130, thereby being in a location to measure the load torque coming from rotor 110. Drive torque 162 is positioned along drive shaft 130 between load torque sensor 160 and main synchronous gear 140, thereby being in a location to measure the drive torque being produced by motor 150.

Motor 150 drives drive shaft 130 through a drive chain 180 that interconnects with drive wheel 170. According to a preferred embodiment, drive chain 180 is configured to produce a four to one step down from motor 150 to drive shaft 130. In other words, drive shaft 130 will rotate once for every four rotations of motor 150. Other step down ratios may also be employed to cause drive shaft 130 to rotate faster or slower, with correspondingly less or more torque, relative to the speed with which motor 150 rotates, without departing from the scope of the subject invention.

Although illustrated as a drive chain, the interconnection and rotational ratio provided by drive chain 180 could as well be provided by a drive belt or gearing.

Four local feedback systems 190, one for each motor 150, provides information from load torque sensor 160 and drive torque sensor 162 to a motor controller 200. Motor controller 200 using the information obtained from the differential torque sensors to communicate instructions to motor 150, controlling the amount of power motor 150 provides to drive shaft 130 through drive gear 180 and drive wheel 170.

Although not illustrated here, the interconnection of drive shaft 130 to rotor shaft 120 can use a step down rotor gear. According to a preferred embodiment, the step down rotor gear employs a four to one step down. As such, rotor 110 (shown in FIG. 1) will rotate once for each four rotations of drive shaft 130 (and for each 16 rotations of motor 150). Other step down ratios may also be employed to cause rotor shaft 120 to rotate faster or slower relative to the speed with which drive shaft 130 rotates, without departing from the scope of the subject invention.

Figure 2:
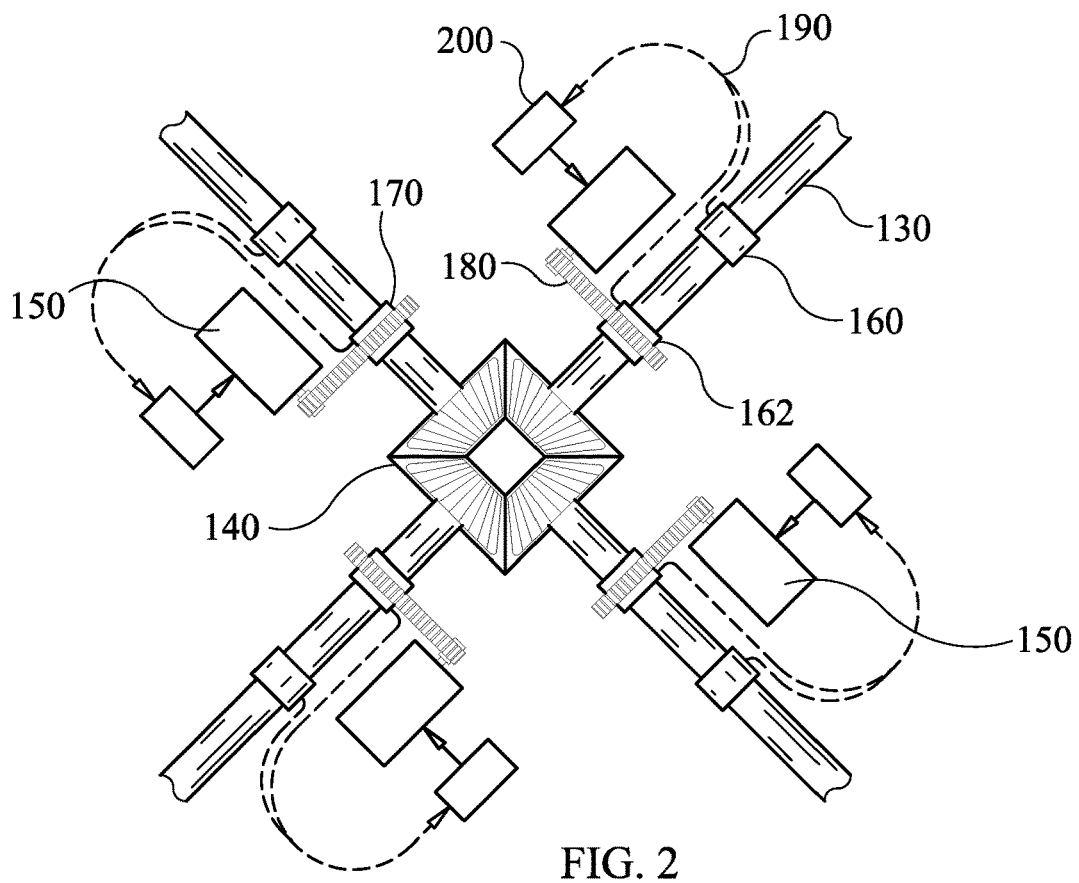
FIG. 2 illustrates the configuration of the rotor drive mechanism with torque sensors, motors and hard gearing.

As can be seen from FIG. 2, main synchronous gear 140 is the hard gearing that causes drive shafts 130 to rotate in synchronous fashion to cause rotors 110 (shown in FIG. 1) to rotate at the same rate and prevent each from colliding with the other. Local feedback system 190 takes the information provided by torque sensors 160 and 162 to motor controller 200 which, in turn, instructs motor 150 to provide more or less power to drive shaft 130 through drive gear 180 and drive wheel 170 such that the load torque measured by torque sensor 160 equals, as closely as possible, the drive torque measured by torque sensor 62.

Figure 3:
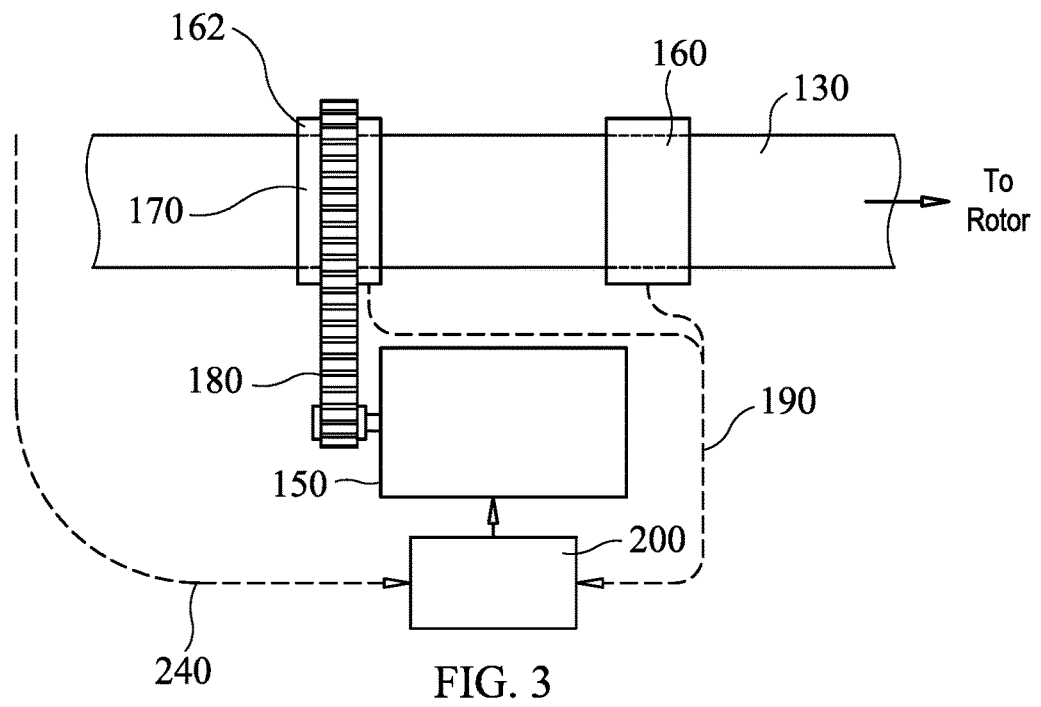
FIG. 3 shows additional detail and configuration of torque sensors in relation to a drive shaft, motor and motor controller.

Additional detail of the configuration of the torque sensor in relation to a drive shaft, motor and motor controller, are shown in FIG. 3. Load torque sensor 160 is mounted along drive shaft 130 between rotor 110 (shown in FIG. 1) and drive wheel 170, and measures the torque load produced by rotor 110. Drive torque sensor 162 is mounted along drive shaft 130 at the point where motor 150 powers drive shaft 130 and is integrated with drive wheel 170. Drive torque sensor 162 measures the torque drive being supplied by motor 150 through drive chain 180 and drive wheel 170.

Local feedback system 190 takes information from torque sensors 160 and 162 and communicates this information to motor controller 200. Motor controller 200 calculates the amount of additional or reduced power that should be supplied to drive shaft 130 from motor 150 in order to have the load torque measured by sensor 160 and the drive torque measured by sensor 162 equal zero. Motor controller 200 then instructs motor 150 to supply more or less power to achieve a zero torque differential.

An overriding feedback system 240 provides further instructions to motor 150 through motor controller 200. The overriding feedback system measures the rotor speed that controls aircraft speed and lift, in relation to the desired rotational speed, and provides this information to motor controller 200. Motor controller 200 translates this information, together with the information obtained through local feedback system 190, to instruct motor 150 to produce more or less power to drive shaft 130. Explained differently, overriding feedback system 240 sets the rpm of motor 150, drive shaft 130 and rotor 110 (shown in FIG. 1) for all four drive shafts 130 and rotors 110, while local feedback system 190 fine tunes the power produced by each motor 150 so that the torque load from rotor 110 matches the torque drive of motor 150, promoting efficiency and reducing stress for any given rotational speed.

Figure 4:
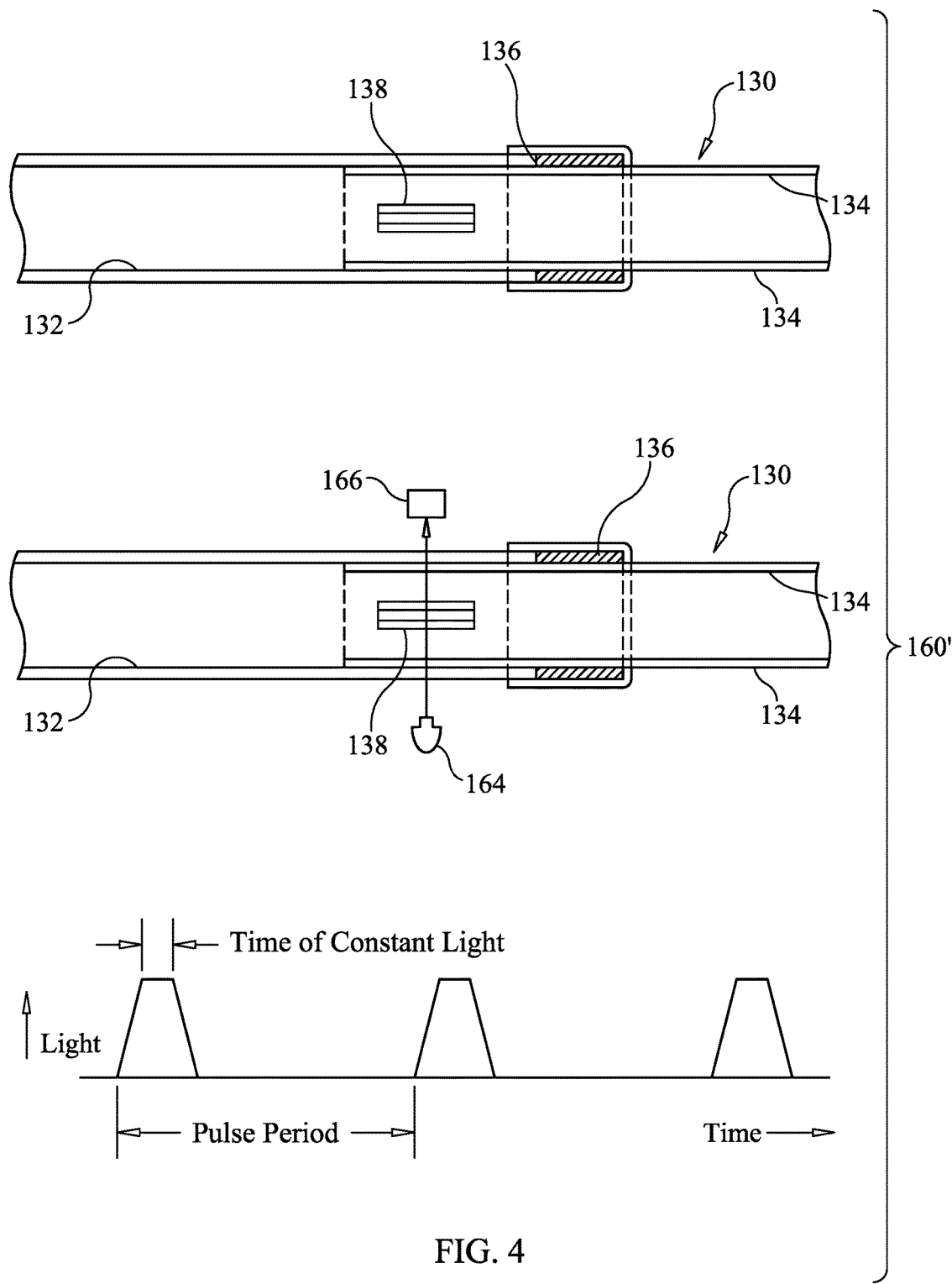
FIG. 4 illustrates, in cross-section, one preferred embodiment of the torque sensor used in the subject invention.

Illustrated in FIG. 4, in cross-section, is one preferred embodiment of a torque sensor 160' that can be used in the subject invention.

According to this embodiment torque sensor 160' is comprised of a solid state laser 164 and a light sensor 166 mounted on opposed sides of drive shaft 130. Drive shaft 130 is further comprised of an outer pipe 132 and an inner pipe 134. Outer pipe 132 and inner pipe 134 are connected by a spring loaded coupling 136. Slots 138 are formed in pipes 132 and 134. At rest, slots 138 in inner pipe 132 and outer pipe 134 are slightly offset.

The inner and out pipes 132 and 134 of shaft 130 will rotate in relation to one another in accordance with the torque applied to shaft 130. Under torque, slots 138 align admitting a light beam from laser 164 which is detected by sensor 166.

Also illustrated in FIG. 4 is a graph showing the output of the light detected by sensor 166 in the torque measurement over time, as shaft 130 rotates. The ratio of time of constant light to the time between light pulses will be proportional to the applied torque. This information is provided by local feedback system 190 (shown in FIG. 2) to motor controller 200 to vary the amount of power motor 150 supplies to drive shaft 130.

It should be noted that torque sensor 160' will not function and does not need to function when drive shaft 130 is at rest. Because the purpose of torque sensor 160' is to measure the torque forces on shaft 130 when rotating a high speeds, in order be in a position to equalize the load and dive torque forces on shaft 130, it is only necessary that torque sensor 160' be able to measure torque when shaft 130 is rotating rapidly.

While preferred embodiment 160' of torque sensors 160 and 162 is described above with reference to FIG. 4, it will be well appreciated by those skilled in the art of rotational mechanics that many other known means of torque sensing may be substituted for the torque sensor 160' shown in FIG. 4 to achieve a similar and satisfactory result, and that such substitution is well within the scope and spirit of the subject invention.

Figure 5:
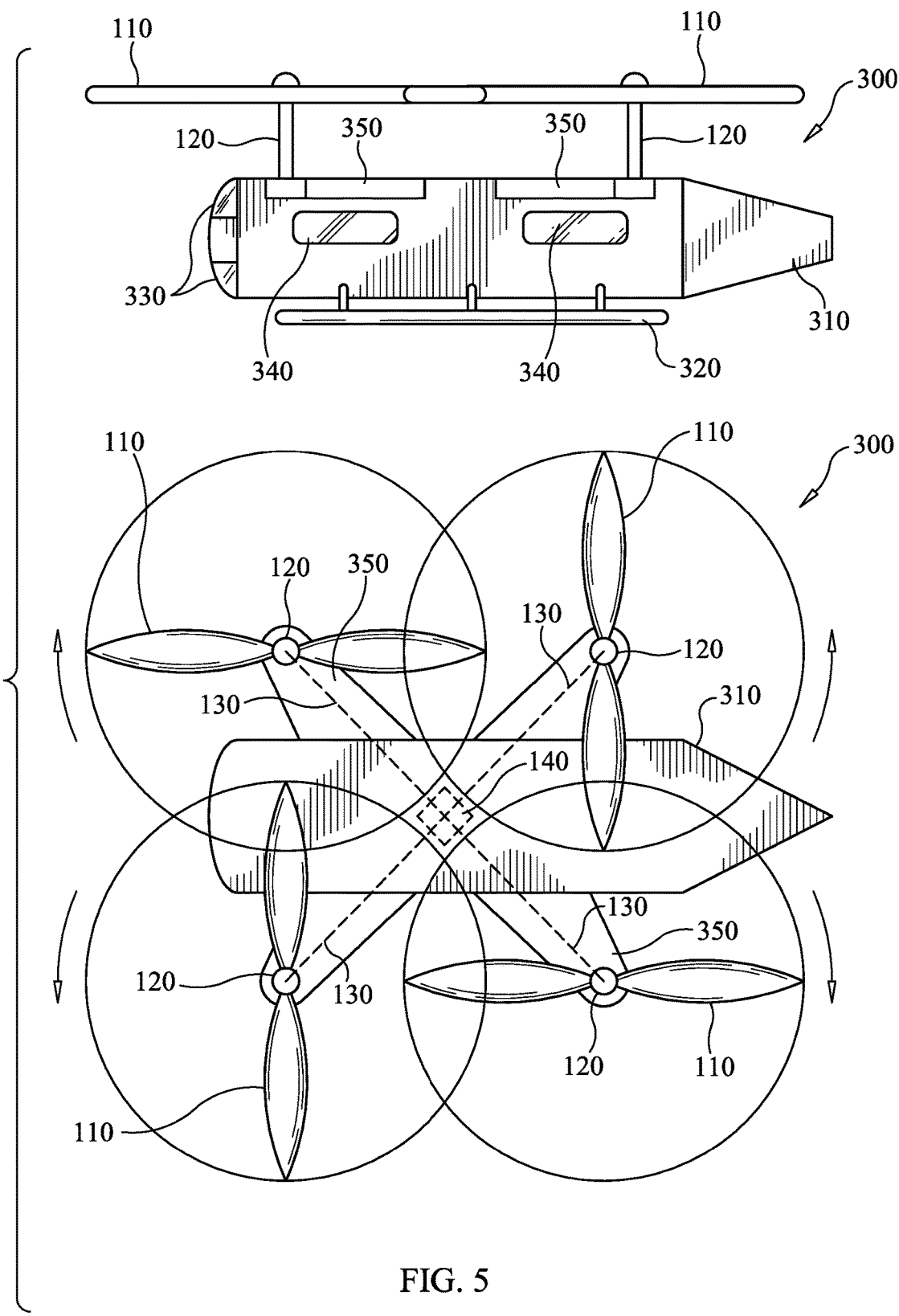
FIG. 5 is a side and top view of a preferred embodiment of a rotor-craft of the present invention illustrating the configuration of rotors in relation to the fuselage.
Figure 6:
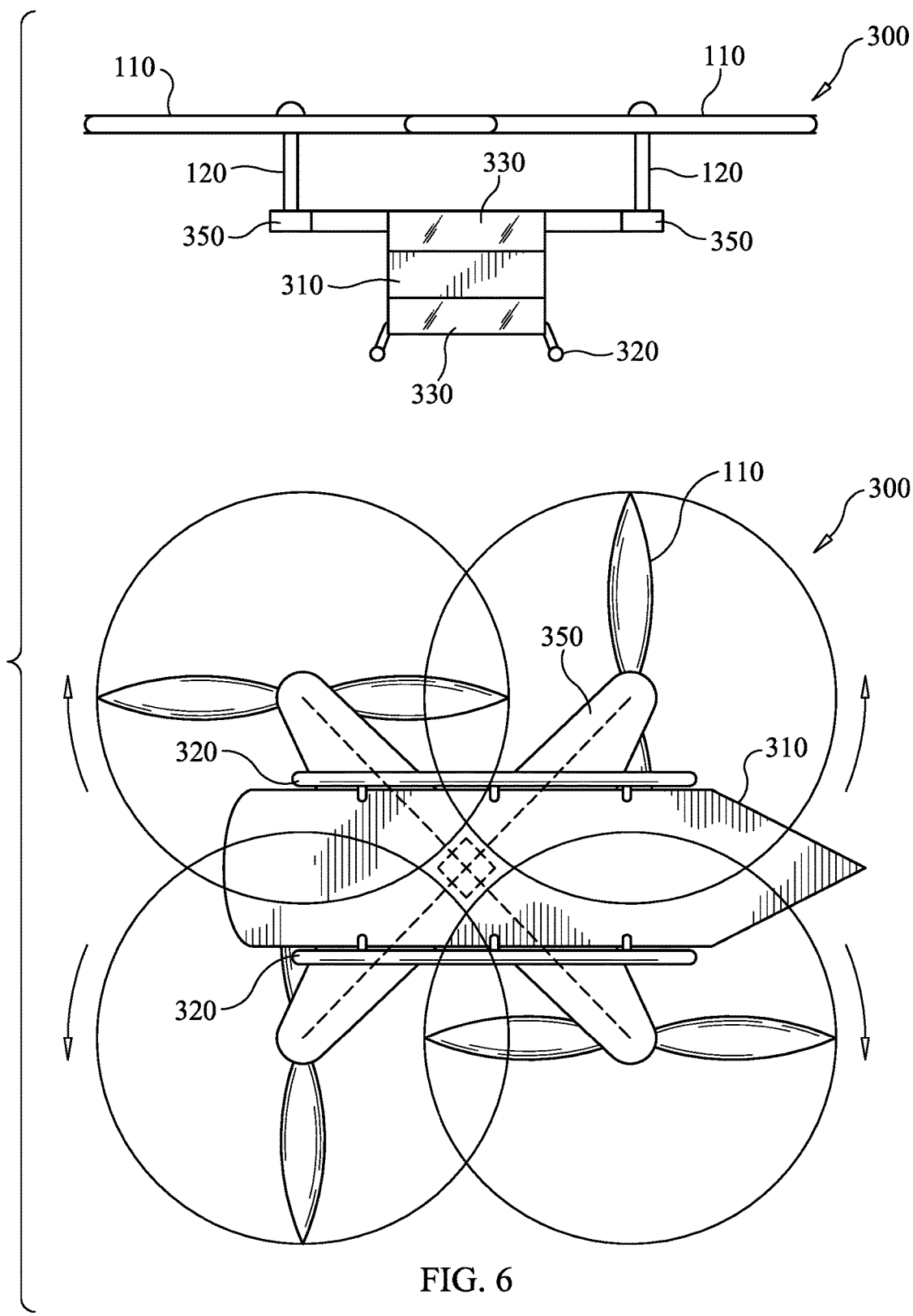
FIG. 6 is a front and bottom view of the preferred embodiment of the rotor-craft depicted in FIG. 5.

A preferred embodiment of the quad-rotor aircraft of the subject invention is shown in FIG. 5 from the side and top, and in FIG. 6 front the front and bottom. A quad-rotor aircraft 300 is comprised of a fuselage 310, an undercarriage 320, forward facing windows 330, side windows 340, and rotors 110. Rotors 110 extend up from fuselage 310 through rotor shafts 120 and rotor supports 350. Drive shafts 130 are enclosed by rotor supports 350 that extend outward from fuselage 310 to directly under rotors 110.

Piloting and Maneuvering

Description of the manner of piloting and maneuvering the quad-rotor aircraft of the subject invention is made with reference to FIGS. 1 through 6 and the accompanying description above.

A major virtue of the quad-rotor aircraft of the present invention, in addition to eliminating the net torque to the body of the aircraft, thus removing the need for a tail rotor, is the ease of maneuvering. There is no need for the swashplate and complicated adjustment of the pitch of the rotors each rotation. Instead, the fixed pitch of each of rotor 110 is separately adjustable during flight, in the manner in which a normal aircraft propeller pitch is adjusted during flight on many fixed-wing aircrafts. As used herein, pitch means blade tilt or angle of attack of the rotor blades. Means for adjusting the fixed pitch of aircraft propellers are well known in the art. Any number of mechanisms exist to for the adjustment of the (fixed) pitch of the rotors.

By way of example, and as illustrated in the table below, for more net lift without lateral motion, all four rotors 110 can have their pitch increased. For forward motion, the back two rotors 110 are given increased pitch, and/or the forward two rotors 110 have their pitch reduced. To travel backward reverses this operation, and sideways increases the pitch of rotors 110 on one side of the aircraft while reducing the pitch of rotors 110 on the other side.

| Maneuver | Left Front Rotor | Right Front Rotor | Left Rear Rotor | Right Rear Rotor |
|---|---|---|---|---|
| Lift | +Pitch | +Pitch | +Pitch | +Pitch |
| Forward | −Pitch | −Pitch | +Pitch | +Pitch |
| Backward | +Pitch | +Pitch | −Pitch | −Pitch |
| Sideways Right | +Pitch | −Pitch | +Pitch | −Pitch |
| Sideways Left | −Pitch | +Pitch | −Pitch | +Pitch |

It is also possible to turn the vehicle without lateral or vertical motion by increasing the pitch of, say, the rotors 110 pair that is rotating counterclockwise while reducing the pitch of the clockwise rotors 110 pair, or vice versa. This applies net horizontal torque to the aircraft. Also, of course, the interaction of any or all of these pitch manipulations is given additional effect by increasing or decreasing the net (synchronized) rotational speed of all four rotors 110, although this would probably be uncommon in normal operation, as is usually also the case for other rotor-craft.

The pitch adjustments and maneuverability described above can, if desired, be accomplished with a single joystick, wherein the lateral shift of the stick produces the tipping actions described above, along with a mechanism that allows a shift along the stick shaft (lengthening or shortening) to increase or decrease pitch of all four rotors. If such a stick is employed, a twist of the stick would rotate the aircraft in the direction of the twist. The total power supplied to all four rotors 110 together through the four electric motors 150 would be a separate control that includes the overriding feedback system 240 that controls power to all four motors to maintain the rotational speed. Other arrangements of course, including for example a steering wheel controller, can also be employed with equally satisfactory results.

In any case the result of this configuration of aircraft 300 is an aircraft that is much more stable and easy to pilot relative to currently available fixed-wing and rotorcraft aircraft. It is quieter with less vibration and greater durability, compared with other rotorcraft, because of the simplicity of the pitch arrangements. Although fins and/or wing-like appendage airfoils known in the art for increasing speed and efficiency would not be necessary, such airfoils could be employed in the aircraft of the subject invention in the case of craft used primarily for higher speed forward motion. The airfoils would function to improve the speed and/or increase lift and stability for forward motion, and could be either fixed or movable, depending upon the design.

In normal operation, as in many helicopters, rotors 110 would be set to a fixed rate of rotation, with the overall power supplied to the motors 150, in a feedback or servo control method, adjusted to maintain that rate, as described above. Then all of the control and maneuvering is accomplished by the separate adjustment of the pitch of the four rotors 110.

The Feedback Loops

The stability and control of the aircraft of the subject invention depends upon two types of feedback. First is the overriding feedback system 240 described above and involves a measurement of the rotational speed of rotors 110 compared to the setting demanded by the control. This control is simple. It modifies the power supplied by all four motors 150 so that the rotational speed will go to or stay at the set value. The feedback system 240 keeps the rotational speed constant regardless of the changing load from the rotor blades 110 created by changes in the pitch (angle of attack) of one or more of the rotor blades 110.

The second feedback system, local feedback system 190, is somewhat more subtle and depends upon the torque sensed by two sensors 160 and 162 on each drive shaft 130. These controls are illustrated best in FIG. 3. One sensor 162 is in the pulley or gear (drive chain 180) driven by electric motor 150, and it measures the torque supplied by motor 150 to drive shaft 130. The second sensor 160 operates between the motor drive 180 and rotor shaft 120. Second sensor 160 measures the torque applied to driveshaft 130 by the rotor load. The action of local feedback system 190 is such as to make these two torque forces equal in absolute value. The torques are in opposite directions, with the motor (drive) torque delivering positive rotational driving force, and the blade (load) torque effectively a "drag", or negative torque.

When these two torque forces are nearly equal in absolute value (or, stated another way, when the signed sum of the two is near zero), the torque supplied by drive chain 180 to the drive shaft 130 is near zero, so that the stress and therefore the wear on these important gears is nearly zero. That is, each motor 150 supplies all the torque necessary to cancel the load or "drag" from its particular rotor 110. The feedback system 190 is designed to accomplish this no matter how the pitches of blades 110 are adjusted.

Computer simulations of the feedback (servo) controls on the configuration described and illustrated demonstrate that, over a wide range of gains and pitch changes, the system is unconditionally stable. Some transient torques can be anticipated to be delivered through the synchronizing gears during changing maneuvers, but these will essentially vanish during steady flight.

Power Supply and Electrical Synchronicity

According to a preferred embodiment, motors 150 are electric and are powered by a battery or a battery set, not shown. The batteries can be recharged during flight by an engine powered generator (also not shown). Suitable generator engines include internal combustion engines and gas turbine engines. The generator engine can be located elsewhere on the aircraft.

In the case of short flights, or if the development of batteries becomes sufficient, the generator engine may be extraneous. Alternatively, motors 150 may be powered directly by a generator with batteries provided as a backup source of power in the case of engine or generator failure.

Additional advantages are achieved using hard gearing or a chain drive for the motor-driveshaft connection. This ensures that the rotational speed of all four motors 150 is identical, making it possible to use the same frequency source to control an alternating current driving motors 150, including for example in a synchronous manner, as is done in some hybrid automobiles. The frequency source can be related to the rotational speed of rotors 110 if that is advantageous, at least after the rotors have started turning and/or after they have reached their running speed. The use of one frequency of alternating current for all four motors 150 allows the use of very efficient motors, such as synchronous ones.

Modularity and Scaling

Other embodiments of the quad-rotor aircraft of the present invention that take advantage of the feedback and torque managed features described above are possible.

According to a preferred embodiment, all of the gearing and powering portions of the aircraft, including torque sensors 160 and 162, motors 150, motor controllers 200, and feedback systems 190 and 240, are contained in a single module. The only connection to this module will be the power and control cables. Therefore it is possible to use more than one module in a single aircraft.

For example one can use two such modules, one in front and one in back, to increase the lifting power and cabin size of the aircraft, much in the manner of the "Chinook" helicopter. Alternatively, one can employ four such modules at the corner of a square array of beams, to create a large aircraft with very large lifting power, to use, for example, in construction.

It will also be obvious to anyone versed in the mechanical, electrical, and aerodynamic arts that the entire system is scalable, that is can be made smaller or larger, depending upon the application required.

SUMMARY AND SCOPE

As described above and illustrated in the accompanying figures, the subject invention is a helicopter that is very safe, environmentally friendly, and easy to fly. By virtue of the manner of electrically powering the four synchronized rotors, the power supplied is very efficient, ultimately from a motor/generator that allows the engine to operate in the most efficient and most non-polluting manner. By using the fixed (but changeable) pitch of the four rotors, control of the aircraft is made simple, and can optionally be combined into a single joystick. Because no swashplates are used, vibration is negligible.

Benefits, other advantages and solutions mentioned herein are not to be construed as necessary, critical, or essential features or components of any or all the claims.

As used herein, the terms "comprises", "comprising", or any variation thereof, are intended to refer to a non-exclusive listing of elements, such that any process, method, article, composition or apparatus of the invention that comprises a list of elements does not include only those elements recited, but may also include other elements described in this specification or their equivalent. The use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or otherwise adapted by the skilled artisan to other designs without departing from the general principles of the invention.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

Certain embodiments are described herein, including the best mode known to the inventor for carrying out the invention. The particular embodiments disclosed herein are intended to clarify the role of the various electrical and mechanical portions of the overall system. Of course, variations on these described embodiments will become apparent to those of ordinary skill in the art upon reading the foregoing description. The inventor expects skilled artisans to employ such variations as appropriate, and the inventor intends for the invention to be practiced otherwise than specifically described herein.

Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

I claim:

1. A rotorcraft aircraft comprising
   a. four offset rotors placed such that each rotor intersects two and only two adjacent rotors;
   b. four motors, each motor powering one said rotor;
   c. a drive mechanism that drives adjacent rotors to rotate in opposite directions while synchronizing the rotation of the rotors to prevent collision of the intersecting rotors; and
   d. means for managing the torque produced by each said motor;
   wherein said torque managing means for each motor comprises
      (1) a set of torque sensors, each such set comprising a load torque sensor and a supply torque sensor, wherein the load torque sensor and the supply torque sensor of each set is mounted on a drive shaft driven by the corresponding motor and driving the corresponding rotor;
      (2) a local feedback system; and
      (3) a motor controller;
   wherein said torque managing means for each motor is configured such that the torque supplied to each rotor substantially balances the torque created by the rotation of said rotor and effectively eliminates the stress placed on said drive mechanism during operation; and
   wherein said local feedback system is configured to use information provided by the corresponding torque sensors to instruct the motor controller to supply more or less torque until the load torque created by the rotation of the rotor is substantially equal to the supply torque provided by the motor.

2. The rotorcraft of claim 1, further comprising an overriding feedback system that controls the power supplied by each motor to cause the corresponding rotor's angular speed to reach and maintain a preset value.

3. The aircraft of claim 1, wherein the motors are electric motors.

4. The aircraft of claim 3, further comprising a generator that provides power to each of the electric motors.

5. The aircraft of claim 4, wherein said generator is an engine selected from the group consisting of internal combustion engines and gas turbine engines.

6. The aircraft of claim 4, further comprising a battery connected to said electric motors to provide temporary energy in the case of failure of the generator.

7. The aircraft of claim 3, further comprising a battery that provides power to each of the electric motors.

8. The aircraft of claim 3, wherein said motors are synchronous motors driven by alternating current of a specific frequency.

9. The aircraft of claim 1, wherein the drive mechanism comprises gearing that connects each rotor to each other rotor restricting rotor rotation to synchronous rotation and driving adjacent rotors in opposite directions.

10. The aircraft of claim 9, wherein said gear mechanism is comprised of bevel gears.

11. The aircraft of claim 9, wherein the powering motors and gearing are contained within a single unit.

12. The aircraft of claim 1 wherein the pitch of each rotor can be adjusted independently or all together to change the amount of lift and the direction of flight of the aircraft.

13. The aircraft of claim 12, further comprising a flight control feedback system that adjusts the collective pitch of each rotor independently or all together in response to control signals sent by the operator of the aircraft.

14. The aircraft of claim 1, further comprising a total of two sets of four intersecting rotors, one set to lift and control the front portion of the aircraft and the other set to lift and control the rear portion of the aircraft, each set of quadrotors having its own set of motors and torque managing means.

15. The aircraft of claim 1 further comprising a total of four sets of four intersecting rotors, one set at each corner of said aircraft, each set having its own set of motors and torque managing means, and wherein the pitch of each said set of rotors may be varied, individually or all together, to control the flight of the aircraft.

* * * * *